United States Patent [19]
Anderson et al.

[11] 3,969,724
[45] July 13, 1976

[54] CENTRAL PROCESSING UNIT FOR USE IN A MICROPROCESSOR

[75] Inventors: Terry M. Anderson, Minnetonka; Reinhard Schumann, St. Paul, both of Minn.

[73] Assignee: The Warner & Swasey Company, Cleveland, Ohio

[22] Filed: Apr. 4, 1975

[21] Appl. No.: 565,239

[52] U.S. Cl. .............................................. 340/172.5
[51] Int. Cl.² .......................... G06F 9/14; G06F 9/18
[58] Field of Search ....................... 340/172.5; 445/1

[56] References Cited
UNITED STATES PATENTS

| | | | |
|---|---|---|---|
| 3,373,407 | 3/1968 | Ling | 340/172.5 |
| 3,500,328 | 3/1970 | Wallis | 340/172.5 |
| 3,518,632 | 6/1970 | Threadgold et al. | 340/172.5 |
| 3,602,889 | 8/1971 | Gayman et al. | 340/172.5 |
| 3,665,409 | 5/1972 | Miller et al. | 340/172.5 |
| 3,739,352 | 6/1973 | Packard | 340/172.5 |
| 3,748,649 | 7/1973 | McEowen et al. | 340/172.5 |
| 3,761,893 | 9/1973 | Morley | 340/172.5 |
| 3,766,527 | 10/1973 | Briley | 340/172.5 |
| 3,766,532 | 10/1973 | Liebel | 340/172.5 |
| 3,886,523 | 5/1975 | Ferguson et al. | 340/172.5 |

Primary Examiner—Mark E. Nusbaum
Attorney, Agent, or Firm—Bosworth, Sessions & McCoy

[57] ABSTRACT

A central processing unit (CPU) is disclosed which can be used in a microprocessor and which has a relatively simple architecture enabling it to perform rapid data processing operations. The CPU has a plurality of registers, an arithmetic logic unit (ALU), and a multiplexor which selects one of the ALU operands. A relatively large scratchpad is included in the CPU to eliminate time-consuming addressing of memories outside the CPU. A parallel architecture and the ability to perform simultaneous operations also enhance the CPU speed. The CPU control unit has a read only memory (ROM) for storage of micro control instructions and a program counter capable of addressing the ROM either sequentially or in accordance with a specific address for execution of jump instructions.

4 Claims, 3 Drawing Figures

CENTRAL PROCESSING UNIT FOR USE IN A MICROPROCESSOR

BACKGROUND OF THE INVENTION

1. Field of the Invention

This invention relates to digital data processing systems, and particularly to such systems of the microprocessor size.

2. Description of the Prior Art

Within recent years the uses of data processing systems have expanded into a great variety of applications. With the number of uses increasing, the number and types of processing systems have also increased. Within the past decade, so-called minicomputers have begun to proliferate for use in tasks that do not require large scale processing systems. As with big systems, the minicomputers operate with changeable programs written in common programming languages such as Fortran and PL/1. The program flexibility of both the large and small computers is very useful in applications using continuously changing programs. The efficiency of such processing systems, however, is dependent greatly upon the efficiency of the Fortran program and of the Fortran compiler. For dedicated applications in which the programs remain constant, these systems are generally inefficient. It has been proven to be much more efficient to write dedicated control application programs in machine language on a smaller system designed for specialized applications.

A line of smaller data processing systems, termed microprocessors or microcomputers, has evolved to handle fixed-program applications. Since the program is fixed and not readily changed, it is stored in a read-only memory unit to protect against erasure or modification.

The advent of these microprocessors has been hastened by recent developments in integrated circuitry. A relatively large memory along with the data selection means for addressing the memory locations can now be formed on a single integrated circuit (IC) unit or chip. Arithmetic logic operators and data registers can also be formed on IC chips. Integrated circuitry has allowed microprocessors to be built smaller than previous minicomputers and as the length of the paths decreases, the processing speeds increase.

The architecture of prior microprocessors has tended to follow basic computer design, only on a smaller scale. Microprocessors have resembled small minicomputers. The reaction to the advent of integrated circuitry has been an attempt to combine as many elements as possible in a single IC chip. Some of the most recent microprocessors have been built completely on a single chip. The fabrication of such complicated IC chips, however, is very expensive.

While traditional computer architecture allows microprocessors to perform rapidly and accurately, it does not take full advantage of the capabilities of a small system. A simpler design may be able to accomplish the same results in a faster time. In addition, the cost of a microprocessor could be significantly decreased by making use of commercially available off-the-shelf IC packages instead of the complicated customized IC chips comprising the entire microprocessor.

Also, in accordance with traditional computer design, most prior microprocessors have a read/write memory for intermediate data storage in addition to the program storage read-only memory. These read/write memories outside the central processing unit reduce the processor speed because of the amount of time needed to address the memory and receive back the data.

SUMMARY OF THE INVENTION

The present invention presents a central processing unit (CPU) for a microprocessor with a relatively simple architecture enabling it to perform data processing operations faster than before possible. The control unit of the CPU can issue commands simultaneously to several controlled units, and a parallel bus architecture allows data to flow through several such units at the same time. The control unit has a read-only memory (ROM) with storage for, preferably, 256 micro control program instructions allowing for a macro instruction set of 68 commands which include a full range of arithmetic and logical operations. This macro instruction set is employed by the microprocessor user to prepare his dedicated program which is stored in a ROM external to the CPU.

A relatively large general register or "scratchpad" memory is also provided in the CPU. This scratchpad preferably has 256 eight-bit registers which provides adequate storage for most dedicated control applications within the CPU. This large scratchpad unit eliminates the need for read/write memories external of the CPU and thereby allows the processor operations to be accomplished much more quickly.

An advantage of all of the above is that a microprocessor using the present invention can be inexpensive and yet compact. It can be constructed with only 48 off-the-shelf integrated circuit chips at a minimal cost. The entire CPU can be assembled on a single printed circuit board measuring no more than eight inches square.

DESCRIPTION OF THE PREFERRED EMBODIMENT

The Microprocessor

Figure 1:
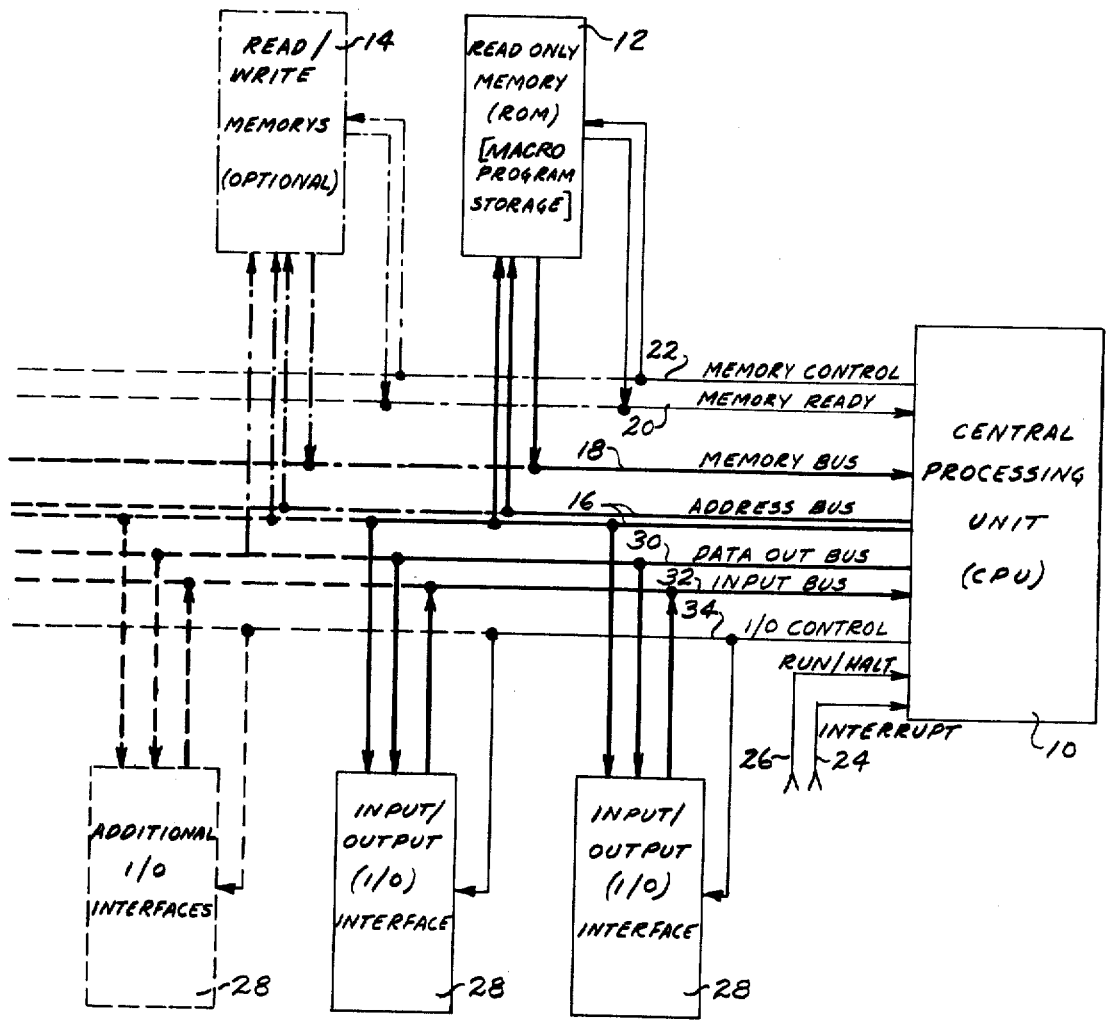
FIG. 1 is a schematic of a microprocessor using a central processing unit embodying the present invention.

Referring more particularly to the drawings and initially to FIG. 1, there is shown the configuration of a microprocessor. The various elements of the microprocessor are shown as blocks, and the data flow between elements is indicated by single lines. The heavier lines represent a plurality of transmission paths, the number of which depends upon the number of data bits being transferred in parallel. Preferably, 8-bit data words are used with the present invention, so that the heavier lines in the drawing represent 8-bit data busses. The thin lines represent single or multiple control lines. All of the elements of the microprocessor are connected to the central processing unit (CPU) 10 which will be described in detail hereinafter. The other elements of the microprocessor include a read-only memory (ROM) 12 which is typically used for storage of the macro instruction program. As mentioned above, a read-only memory is used for the macro program storage instead of a read/write memory to protect the program against inadvertent erasure or modification. The ROM 12 may also contain data tables of various kinds. Optionally, a read/write memory 14 may be added to the microprocessor to provide additional storage for data.

The CPU 10 communicates with the ROM 12 via an address bus 16 and a memory bus 18. The CPU 10 sends an address corresponding to the current instruction to the ROM 12 on the address bus 16. The ROM 12 receives the address, retrieves the instruction from that address, and returns it to the CPU 10 via memory bus 18. When the ROM 12 is ready to transmit the instruction over the memory bus 18, it communicates its readiness by sending a signal over memory ready line 20. This sequence permits the CPU to be used with memories of any speed, that is, the memories need not be synchronized to the CPU clock. After receiving the memory ready signal on the memory ready line 20, the CPU 10 reads the instruction, interprets it, and executes it. In executing the instruction, the CPU 10 may require additional data from either the ROM 12 or the optional read/write memory 14. This data is retrieved by addressing the appropriate memory via address bus 16 and receiving the requested data on memory bus 18. Preferably, the address bus 16 has a 16-bit capacity. This permits access to up to 64K memory locations. The 16-bit address bus is represented in FIG. 1 by dual 8-bit, or heavier, lines.

Data can be stored in the read/write memory 14 using a similar sequence. The CPU 10 sends an address on the address bus 16 corresponding to the desired data storage location. A signal is also sent over the memory control line 22 to inform the memory 14 that the address is for data storage and not for data retrieval. At the same time, the data to be stored is placed on a data out bus 30. The memory 14 accepts the data and stores it in the proper location address. When the memory has completed the loading, it communicates its completion to the CPU by sending a signal over the memory ready line 20.

The CPU 10 communicates with one or more input/output (I/O) interfaces 28. The CPU 10 is connected to I/O interfaces 28 via the address bus 16, the data out bus 30, an input bus 32, and an I/O control line 34. The CPU communicates with the I/O interfaces by executing special I/O macro instructions received from the ROM 12. In order to execute these instructions, the CPU 10 places an address on the lower-half of the address bus 16. If the instruction is an output instruction, the CPU will also place data for output on the data out bus 30 and send a signal over the I/O control line 34. The I/O interface selected by the address responds to the address on the address bus 16 and the I/O control signal on line 34 by accepting the data on the data out bus 30. If the instruction is an input instruction, no signal is sent over I/O control line 34, and the I/O interface selected by the address will respond to the address on the address bus 16 by placing data for input on the input bus 32. The CPU 10 then accepts the data from the input bus 32.

The operations of the CPU are externally controlled through an interrupt line 24 and a run/halt line 28. If an interrupt signal is sent over the interrupt line 24, the CPU executes a jump to a subroutine stored in a predefined location in the micro control program memory. This feature facilitates rapid response to an external signal and provides for easy interface to real-time devices. If a halt signal is sent over the run/halt line 26, the CPU is placed in the halt state and no further instructions are executed until the halt signal on line 26 is removed.

Central Processing Unit

Figure 2:
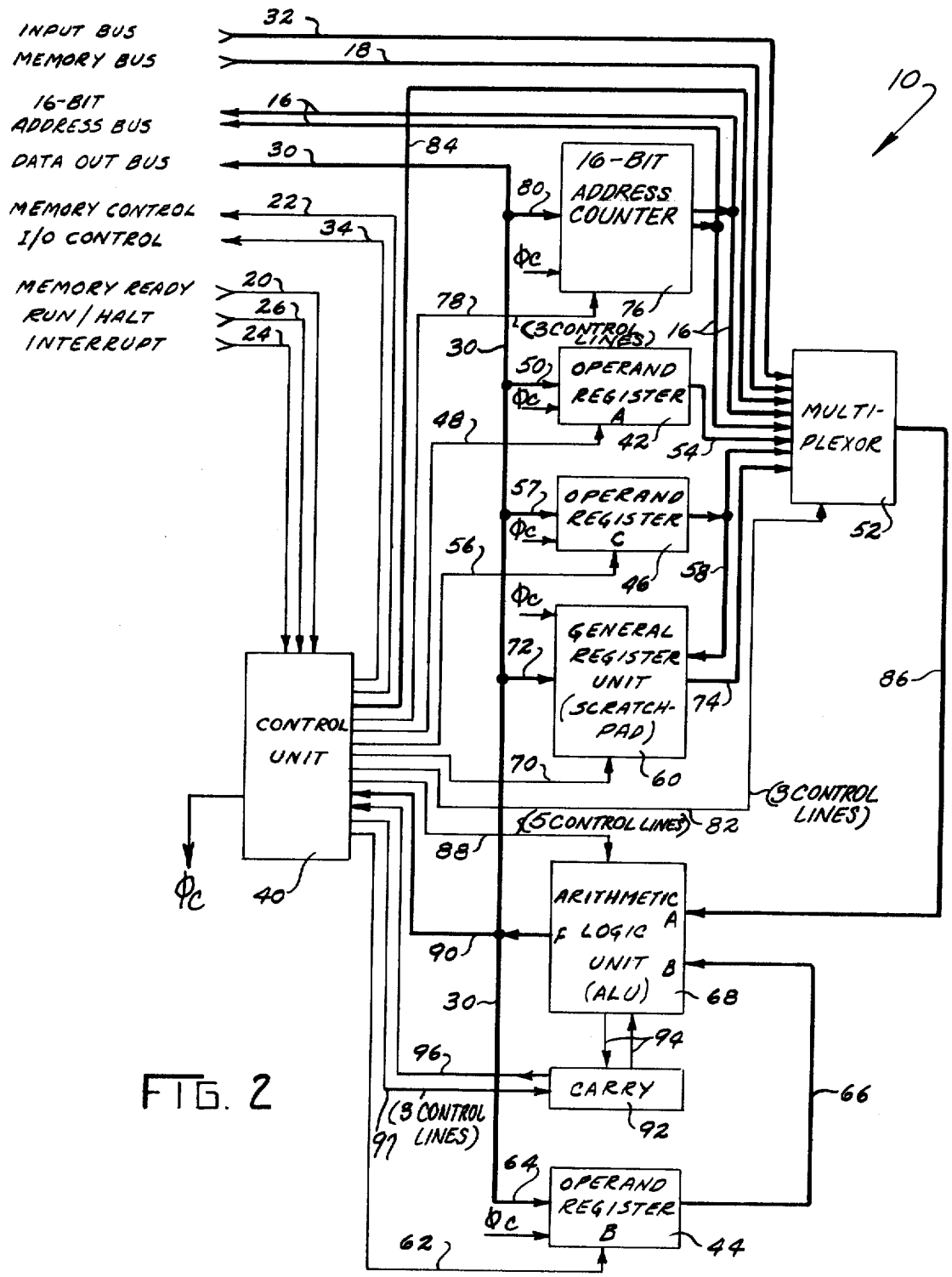
FIG. 2 is a detailed schematic of the central processing unit of FIG. 1.

The CPU 10 of FIG. 1 is shown in more detail in FIG. 2, in which the various registers and other elements are depicted by blocks. As in FIG. 1, the heavier lines represent 8-bit data busses, and the thin lines represent single or multiple control lines. The operation of the CPU is controlled by a control unit 40. The control unit 40, which will be described in more detail later, receives and interprets the macro program instructions from ROM 12 and executes the instructions by transferring data in and out of the various registers and other elements. In order to accomplish this, the control unit 40 is directly connected by control lines and data busses to each of the registers an units of the CPU.

The CPU also has three single-word 8-bit operand registers designated the A operand register 42, the B operand register 44, and the C operand register 46. These registers are of the type known as parallel-in-parallel-out in that, upon receipt of a load signal from the control unit 40 over associated control lines, the eight-bit data word on bus 30 is loaded in parallel into the register on the next clock pulse $\phi c$. Each operand register unit can be built from two 4-bit IC registers.

Operand register 42 is controlled by the control unit 40 by means of a single control line 48. Input data for storage from data out bus 30 is loaded into register 42 through connection 50 on a clock pulse $\phi c$ when line 48 carries a load signal. Register 42 supplies an 8-bit data word to one input of a multiplexor 52 over an 8-bit bus 54.

Similarly, the loading of operand register 46 is controlled by a single control line 56 from the control unit 40. It receives input data from data bus 30, at connection 57, and outputs data to the multiplexor 52 over bus 58. Bus 58 is also connected to the scratchpad 60, supplying the address for all scratchpad operations.

The loading of operand register 44 is controlled by load control line 62 from control unit 40. Operand register 44 receives data from the data out bus 30 via connection 64. Operand register 44 is also connected to an eight-bit bus 66 which allows the data in register 44 to be supplied as an 8-bit word to the B side of arithmetic logic unit 68.

A unique feature of this CPU is its large general register unit or "scratchpad" 60. In the preferred architecture of the CPU, the scratchpad 60 is a random access memory unit having 256 eight-bit registers. Such a unit can be constructed from eight interconnected 256 × 1 RAM's forming a 256 × 8 organization. The micro control program reserves three of these registers for use as an accumulator, a stack pointer, and a carry register. The remaining registers can be used by the macro programmer in various modes, including modes normally reserved for registers and modes normally restricted to main memories. The large scratchpad unit allows the functions of registers and a main memory to be combined and thus eliminates the need for a main random access storage subsystem. In many microprocessor applications, the amount of intermediate data storage required is quite moderate. For a large proportion of dedicated control applications, it has been found that 2048 bits of data storage are ample. Providing data storage capability within the CPU and eliminating the need for a random access memory outside the CPU presents possibilities for very efficient programming of the microprocessor resulting in faster processing times than before possible.

The scratchpad write/read functions are controlled by the control unit 40 through a single control line 70. Data can be written on the scratchpad 60 on a clock pulse $\phi c$ with the data being supplied through a connection 72 from data out bus 30 when the control unit 40 places a write signal on line 70. The scratchpad address is supplied through bus 58 from operand register 46. Data is outputted from the scratchpad 60 through bus 74 to the multiplexor 52.

An address counter 76 is included in the CPU for the storage of address information for its output on the address bus 16. Preferably, the address counter has a 16-bit capacity to enable the CPU to have access to up to 64K macro memory locations. Only the lower half of the address counter need be used to store I/O address, since this is sufficient capability to enable the CPU to have access to 256 I/O devices. The address counter can be constructed from four interconnected four-bit IC counters such as, for example, 9316 IC units manufactured by the Fairchild Semiconductor Division of the Fairchild Camera and Instrument Corporation and described and explained in the 1972 Fairchild Semiconductor TTL Data Book on pages 8–54 to –59. These are interconnected to define two eight-bit counters which comprise the lower and upper halves of the address counter 76. Each half of the counter may be set to an eight-bit count on command from the control unit 40. Also, on command from the control unit 40, the 16-bit counter may be incremented by one count on receipt of a clock pulse $\phi C$. The operations of the address counter 76 are controlled by the control unit 40 by means of three control lines 78. The control unit 40 applies an enable signal on the first control line 78 to cause the upper half of the counter to be set to a count in accordance with the existing 8-bit data word on the data out bus 30. Likewise, the control unit 40 applies an enable signal on the second control line 78 to cause the lower half of the counter to be set to a count in accordance with the data word on bus 30. These count settings are accomplished by loading the selected half of the counter through connection 80. Also, the control unit 40 applies an enable signal on the third control line 78 to cause the entire 16-bit counter to be incremented by one count on receipt of a clock pulse. The address counter 76 outputs a 16-bit address over the address bus 16. The address bus 16 carries this address out of the CPU to memories 12 and 14 and the I/O interfaces 28 already described or to the multiplexor 52.

The multiplexor 52 is controlled by the control unit 40 over three control lines 82 to select which of the eight 8-bit data words applied to the multiplexor will be gated to the "A" side of the arithmetic logic unit 68. The multiplexor 52 receives data from eight sources: from the I/O interfaces 28 over input bus 32, from the ROM 12 or the optional read/write memory 14 over memory bus 18, from the control unit 40 over bus 84, from either half of the address counter 76 over the upper and lower halves of the address bus 16, from the A operand register 42 over bus 54, from the C operand register over bus 58, and from the scratchpad 60 over bus 74. The multiplexor selects from one of these eight inputs and passes the data therefrom onto bus 86 for input on the "A" side of the arithmetic logic unit 68. The multiplexor can be constructed, for example, from eight Fairchild 93151/54141 or 74151 units described on pages 8-265 to -271 of the aforementioned 1972 Fairchild Data Book.

The arithmetic logic unit (ALU) 68 performs the operations on the data. The ALU 68 has the capability of carrying out up to 32 possible operations on two operands including adding, substracting, incrementing, decrementing, logical AND, logical OR, exclusive OR, zero, FF (hexadecimal), or passing through either operand unchanged. The ALU can be constructed, for example, from Fairchild 9341/54181 or 74181 units described on pages 8-157 to -161 of the 1972 Fairchild Data Book. The operation of the ALU is controlled from the control unit 40 through five control lines 88. The two operands are input to the ALU by busses 86 and 66. Bus 86 feeds the "A" side of the ALU as selected by the multiplexor 52. Bus 66 feeds the "B" side of the ALU from the B operand register 44. The result is outputed on the "F" side of the ALU to data bus 90. Data bus 90 carries data to the control unit 40 and to the data out bus 30. The data out bus 30 transports the data to any of the other registers in the CPU or out of the CPU to memory or I/O.

The ALU 68 is connected to a single-bit carry register 92 via connecting lines 94. The carry register can be set or cleared depending upon the result of ALU arithmetic operations. The carry is also controlled through lines 96 by the control unit 40.

The three operand registers 42, 44, and 46, the scratchpad 60, and the address counter 76 are all capable of receiving input data placed on the data out bus 30 from the "F" side of the ALU 68. This parallel bus architecture allows the performance of many simultaneous operations. The control unit 40 dictates which units are to accept inputs from the data out bus. Since all units can accept input simultaneously, and since the control unit 40 can issue several simultaneous commands to different units over its various control lines, the microprogramming of the CPU can contain complex instructions to perform several simultaneous operations. For instance, the contents of the A operand register 42 can be gated through the multiplexor 52 and into the ALU 68 where it can be added to the contents of the B operand register 44 and the result from the ALU can be stored into one or more registers and the scratchpad 60 simultaneously via the data out bus 30 all within a single clock interval. In addition, during this clock interval, the carry can be set or cleared, and the address counter can be incremented. Thus, the CPU can accomplish operations with a minimum of microprogrammed instructions.

Control Unit

Figure 3:
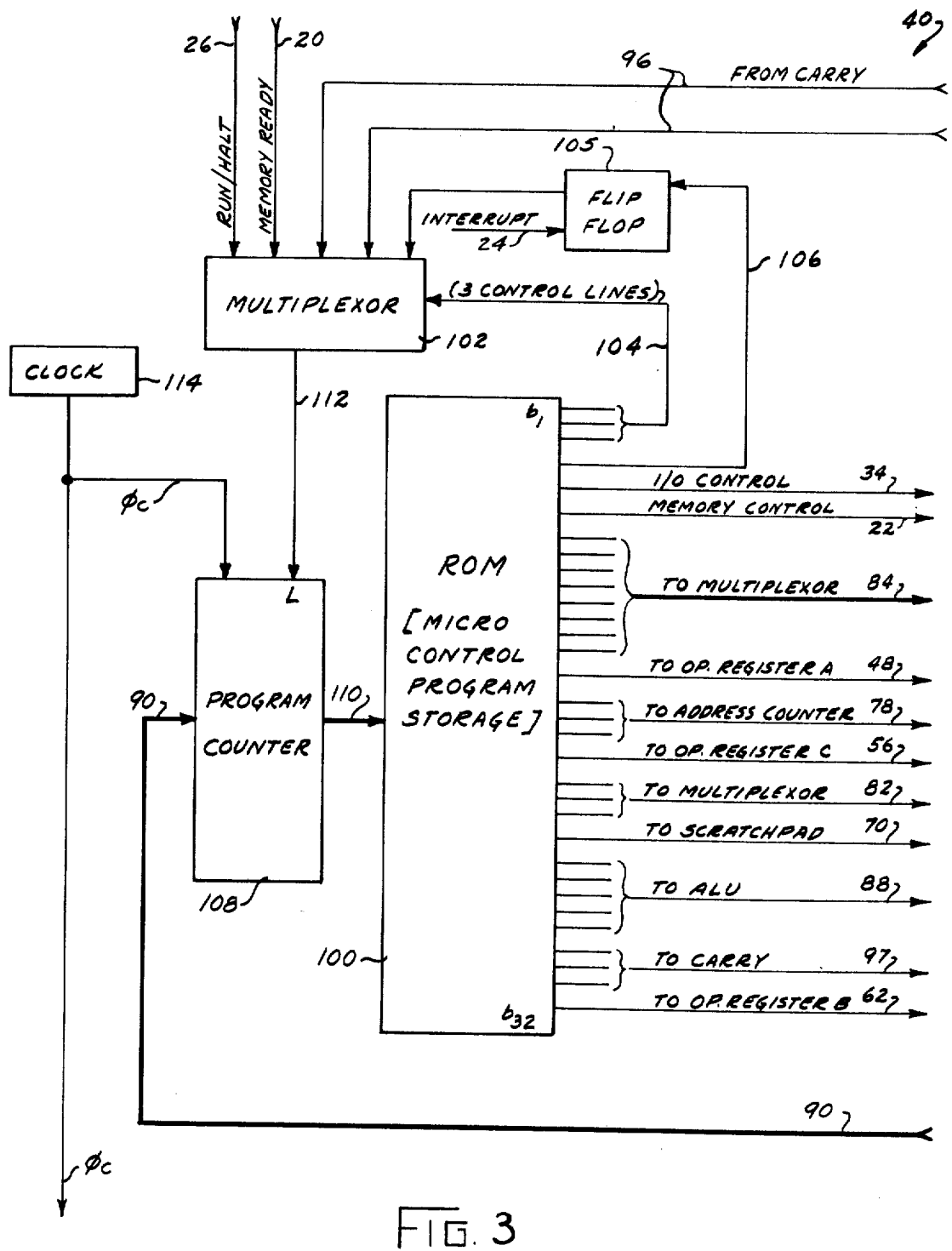
FIG. 3 is a detailed schematic of the control unit of FIG. 2.

The control unit 40 of FIG. 2 is illustrated in greater detail in FIG. 3. The control unit regulates the operation of the CPU by issuing signals over the various control lines. These signals are generated in response to macro instructions by a micro control program stored in a ROM 100 within the control unit 40. The micro control program includes instructions which bring the macro program instructions into the CPU from the ROM 12, decode the macro instructions, and execute them by moving data over the various data paths of the CPU. Preferably, the control unit 40 includes a 256 × 32 ROM for micro control program storage. This provides sufficient storage for a 256-instruction micro control program with each instruction comprising a 32-bit word ($b_1$ through $b_{32}$).

Each 32-bit instruction contains both data and control bits. Three control bits are employed to control a multiplexor 102 via control lines 104. Another bit controls the interrupt flip-flop 105 over line 106. One bit is employed for I/O control via the I/O control line 34. One bit is employed for memory control via the memory control line 22. Eight bits are data carried by data bus 84 to the multiplexor 52. One bit controls the loading of the A operand register 42 via control line 48. Three bits are used to control the address counter 76 over the control lines 78. One bit control the loading of the C operand register 46 via control line 56. Three bits are used to control the multiplexor 52 over control lines 82. One bit controls the scratchpad 60 through line 70. Five bits are used to control the various arithmetic and logical operations of the ALU 68 over the control lines 88. Three bits communicate with the carry 92 over control lines 88. The final bit controls the loading of the B operand register 44 via line 62.

The ROM 100 is addressed by a program counter 108 via bus 110. The counter 108 has two modes of operation: incremental loading of the ROM 100, or loading a specific address location in accordance with data imputted from the ALU 68. The mode of operation of the program counter 108 is controlled by the signal sent by the multiplexor 102 over control line 112. In the incremental mode of operation, the program counter 108 is incrementally actuated by clock pulses $\phi c$ so as to count in an upward direction. In the specific-address mode of operation, the multiplexor 102 supplies a load signal on line 112. The program counter 108 receives this load signal at its loading control input L. At the next clock pulse $\phi c$, the counter 108 is set to a count in accordance with the eight-bit data present on the data out bus 30 through bus 90. This count serves as an address for addressing a specific location in the ROM 100. The counter can be constructed, for example, from a single Fairchild 9316 already described.

The program counter 108 is usually operated in the incremental mode. After a micro control instruction has been executed, the program counter 108 at the next clock pulse $\phi c$ will load the next address into the ROM 100 so that the next micro instruction in sequence will be executed. However, if the last micro instruction is a jump instruction, the program counter 108 may go into the specific-address mode of operation and may not load the next address into the ROM 100, but instead load the ROM 100 with the address present on bus 90. These jump instructions depend upon certain machine status conditions, such as memory ready, run/halt, interrupt, or a carry. During the execution of a micro jump instruction, one of these machine status conditions will be examined. The ROM 100 controls the selection of the status condition to be examined by sending a coded three-bit signal over control lines 104 to the multiplexor 102. The multiplexor 102 responds to the signal on lines 104 by selecting one of the machine status condition inputs and passing the selected status condition onto line 112. The machine status inputs to the multiplexor 102 include the memory ready line 20, the interrupt line 24, the run/halt line 26, two lines 96 from the carry 92 which provide the carry bit and the inverted carry bit, and line 106 from the ROM 100. Since at least five machine status inputs are applied to the mutiplexor 102, three control lines 104 are needed to select one of the machine status inputs. The multiplexor 102 can be constructed, for example, from a single Fairchild 93151/54151 or T4151 unit already described. If a TRUE signal is received over the machine status line being examined, this signal is passed onto line 112 and a load signal is received at load control input L of the program counter 108.

For example, if the machine status condition to be examined is memory ready, the proper three-bit signal will be sent over control lines 104 so that the multiplexor 102 will pass the memory ready signal from the memory ready line 20 through the multiplexor 102 and onto line 112. This signal then controls the mode of operation of the program counter 108 through its input at the load control input L. If the memory ready signal is TRUE, the program counter 108 will be loaded from bus 90. Otherwise, the counter 108 will be incremented by one.

Any of the other machine status conditions, such as interrupt, run/halt, carry zero, or carry not zero, may be similarly selected to control the loading of the program counter 108. After sending the proper signal over control lines 104, a logical TRUE or FALSE condition may be gated through the multiplexor 102 to control the loading of the counter 108. This allows for unconditional loading or unconditional incrementing of the program counter 108, respectively.

The clock 114 provides the timing for the synchronous operations of the microprocessor. Preferably, the clock 114 comprises a single phase crystal-controlled oscillator running at 4.608 MHz. This frequency is a multiple of all common communication band rates and can thus provide, through frequency division by a counter, an extremely stable time base for any communications interface. As shown in FIG. 2, the clock output $\phi c$ is connected to each of the registers and counters of the CPU so that the function of each unit is synchronized to the clock cycle. For the sake of clarity, the complete connection of the clock phase line $\phi c$ between the control unit 40 and each register and counter has been ommitted.

Micro Control Program

This control unit ROM 100 contains a 256-instruction micro control program. This program controls the operation of the CPU by directing data over the various data paths through commands issued over the various control lines. Specifically, the control program directs the input of each macro instruction, the decoding of that instruction, and the execution of the instruction. The control program also monitors the run/halt and the interrupt lines.

The preferred micro control program is presented below. In the source code of the micro control program the following formats are used:

| | |
|---|---|
| aaaa: | Instruction address mnemonic "aaaa" corresponds to this instruction |
| jjjj: aaaa | Execute jump instruction "jjjj" and if successful, jump to address "aaaa" |
| rrr= | Load into register or counter "rrr" |
| =nnn | The symbols "nnn" are a hexadecimal number and not a mneumonic. |

The source code also uses the following mneumonics and symbols:

Registers, Counters and Busses
ACC      Accumulator (address 00 in scratchpad)
ACCA    Accumulator address
ALR      Lower half of address counter
AUR     Upper half of address counter

-continued

| | | |
|---|---|---|
| CY | Carry register | |
| IDB | Input data bus | |
| MCY | Macro carry (address 01 in scratchpad) | |
| MCYA | Macro carry address | |
| ORA | Operand register A | |
| ORB | Operand register B | |
| ORC | Operand register C | |
| PROM | Memory bus | |
| ROM | Control unit data bus | |
| RRR | Scratchpad | |
| SP | Stack pointer (address 02 in scratchpad) | |
| SPA | Stack pointer address | |

Arithmetic Logic Unit Operations

In the following operations, the letters "rrr" represent the multiplexor output corresponding to the register or counter selected by the multiplexor:

| | | |
|---|---|---|
| rrr | ANDB | Logically AND ORB with "rrr" |
| rrr | IORB | Logically OR ORB with "rrr" |
| rrr | NANB | Logically NAND ORB with "rrr" |
| rrr | NXRB | Logically exclusive NOR ORB with "rrr" |
| rrr | XORB | Logically exclusive OR ORB with "rrr" |
| rrr | +ORB | Add ORB and carry to "rrr" |
| rrr | −ORB | Add inverse of ORB and carry to "rrr" |
| rrr | +CY | Add carry to "rrr" |
| rrr | −1+C | Decrement and add carry to "rrr" |
| rrr | *2 | Add "rrr" to itself and carry |
| NOT | rrr | Invert "rrr" |
| NOTB | | Invert ORB |
| rrr | | Pass "rrr" through unchanged |
| ORB | | Pass ORB through unchanged |
| '00' | | Transmit zero |
| 'FF' | | Transmit FF (hexadecimal) |
| FF+C | | Add FF (hexadecimal) and carry |

Other Operations
| | |
|---|---|
| CLRC | Clear carry |
| INCA | Increment address counter |
| INTR | Reset interrupt |
| IOWS | Send I/O control signal (write to output) |
| LDCY | Load carry from ALU result |
| MEMW | Send memory control signal (write to memory) |
| SETC | Set carry |

Jump Instructions
| | |
|---|---|
| JCZ | Jump if carry is zero |
| JCN | Jump if carry is not zero |
| JINT | Jump if interrupt signal on interrupt line |
| JMNR | Jump if memory not ready signal on memory ready line |
| JNF | Jump if ALU output is not FF (hexadecimal), |
| JRUN | Jump if halt signal on run/halt line |
| JUN | Jump unconditional |

Symbol Table
| Mneumonic | Address |
|---|---|
| ADD | 00B9 |
| ADD1 | 00BA |
| AND | 00EC |

-continued

| | |
|---|---|
| BCL | 00D9 |
| BST | 00B2 |
| BTS | 004F |
| CMA | 008B |
| CMC | 0026 |
| COM | 00CB |
| COUT | 00BC |
| DCA | 00D7 |
| DEC | 00CF |
| DJX | 00F3 |
| FTCH | 000E |
| HALT | 0006 |
| IN | 00AC |
| INA | 008E |
| INC | 006B |
| INCO | 00C2 |
| INT | 0014 |
| INTE | 0045 |
| JCN | 001D |
| JCZ | 00C0 |
| JPA | 005A |
| JUX | 002A |
| LDM | 00A1 |
| LOAD | 003C |
| MVR | 0056 |
| MWAT | 0011 |
| OR | 00E8 |
| OUT | 0061 |
| PWUP | 0001 |
| RENT | 00BB |
| REST | 00A9 |
| RLC | 0067 |
| RLC1 | 0068 |
| RLC3 | 0095 |
| RLC4 | 0097 |
| ROL | 00D2 |
| RUN | 0010 |
| ST | 0017 |
| STC | 009C |
| STM | 0082 |
| SUB | 00B8 |
| WAT1 | 0022 |
| WAT4 | 00B5 |
| WAT5 | 00DC |
| WAT7 | 00F6 |
| WAT8 | 00A7 |
| WATA | 0052 |
| WATC | 0043 |
| XOR | 00E4 |
| ZTC | 0054 |

Binary numbers are represented herein in hexadecimal form, that is, each numerical digit represents a number between 0 and 15, or four binary bits. The symbols "A", "B", "C", "D", "E" and "F" are used in the numerals to represent the values of 10, 11, 12, 13, 14 and 15, respectively. Thus, the numeral "OF" represents the value 15, the numeral "10" represents the value 16, and the numeral "FF" represents the value 255.

The following listing presents the micro control program. For each of the 256 instructions, the instruction address is given, followed by the instruction in machine code as it is actually programmed into the control unit ROM, and the instruction in source code using the mnemonics given above.

| Address | Machine Code | Source Code |
|---|---|---|
| | | Power up clear routine |
| 0000 | F2005CDB | =0000:ALR= ORC= '00' |
| 0001 | 45005CDA | PWUP:AUR= ORA= RRR= SETC IOWS '00' |
| 0002 | F200805B | :ALR= ORC= ORC +CY LDCY |
| 0003 | E3FE5F9B | :JCZ ;PWUP |
| | | Halt and front panel control |
| | | Read address from FF and output |
| | | appropriate register to FF |
| 0004 | F3FD5FDB | :ORC= SPA |
| 0005 | C3FC5FDB | :SP= =003 |
| 0006 | E700005B | HALT:ORA= ORA +CY LDCY |
| 0007 | E3F15F9B | :JCZ ;FTCH |
| 0008 | EB0030DB | :ORB= NOT ALR |
| 0009 | E3EF5FAB | :JRUN;RUN |
| 000A | E20053DB | :ALR= 'FF' |
| 000B | E300F0DB | :ORC= NOT IDB |

-continued

| Address | Machine Code | Source Code |
|---|---|---|
| 000C | E300BFDA | :IOWS RRR |
| 000D | E2005ADB | :ALR= ORB |
| | | Main instruction fetch |
| 000E | 63EF5FAB | FTCH:SETC JRUN;RUN |
| 000F | E3F95FEB | :JUN ;HALT |
| 0010 | E3EB5FFB | RUN :JINT;INT |
| 0011 | E3EE5FCB | MWAT:JMNR;MWAT |
| 0012 | 6B007FDF | :ORB= PROM SETC INCA |
| 0013 | E3E05BEB | :JUN =01F IORB |
| | | Interrupt (PSEUDO SUB JUMP) |
| 0014 | EB005CD3 | INT :INTR ORB= '00' |
| 0015 | E7EF5FDB | :ORA= =010 |
| 0016 | E3BA5FEB | :JUN ;INTE |
| | | Store to register instructions |
| 0017 | F3FF5FDB | ST :ORC= ACCA |
| 0018 | EB00BFDB | :ORB= ACC |
| 0019 | F3001FDB | :ORC= ORA |
| 001A | C3005ADB | :RRR= ORB |
| 001B | E3F15FEB | :JUN ;FTCH |
| | | Jump on carry not zero |
| 001C | B3FE5FDB | =001C:ORC= MCYA CLRC |
| 001D | E300AF5B | JCN :RRR −1+C CDCY |
| 001E | E33D5F9B | :JCZ ;INCO |
| 001F | E7E05EDB | =001F:ORA= =01F ANDB |
| 0020 | EB00D0DB | :ORB= NOT AUR |
| 0021 | EB1F5EDB | :ORB= =0E0 ANDB |
| 0022 | E3DD5FCB | WAT1:JMNR:WAT1 |
| 0023 | E2007FDB | :ALR= PROM |
| 0024 | E1001BDB | :AUR= ORA IORB |
| 0025 | E3F15FEB | :JUN ;FTCH |
| | | Complement carry |
| 0026 | F3FE5FDB | CMC :ORC= MCYA |
| 0027 | 6B00BFDB | :ORB= MCY SETC |
| 0028 | C3FE595B | :MCY= =001 −ORB |
| 0029 | E3F15FEB | :JUN ;FTCH |
| | | Jump extended instruction |
| 002A | E3D55FCB | JUX :JMNR;JUX |
| 002B | EF007FDF | :ORA= ORB= PROM INCA |
| 002C | E3DD5FEB | :JUN ;WAT1 |
| | | Jump table for 2 and 3 byte instructions |
| 002D | 63475FEB | =002D:SETC JUN ;SUB |
| 002E | A3465FEB | :CLRC JUN;ADD |
| 002F | E3135FEB | :JUN ;AND |
| 0030 | E3175FEB | :JUN ;OR |
| 0031 | E31B5FEB | :JUN ;XOR |
| 0032 | E3345FEB | :JUN ;COM |
| 0033 | E3945FEB | :JUN ;INC |
| 0034 | E3305FEB | :JUN ;DEC |
| 0035 | A30C5FEB | :CLRC JUN ;DJX |
| 0036 | E3E85FEB | :JUN ;ST |
| 0037 | E3535FEB | :JUN ;IN |
| 0038 | E39E5FEB | :JUN ;OUT |
| 0039 | 635E5FEB | :SETC JUN ;LDM |
| 003A | 637D5FEB | :SETC JUN ;STM |
| 003B | E3A95FEB | :JUN ;MVR |
| | | Load instructions |
| 003C | F3FF5FDB | LOAD:ORC= ACCA |
| 003D | C3001FDB | :ACC= ORA |
| 003E | E3F15FEB | :JUN ;FTCH |
| 003F | E7E05EDB | =003F:ORA= =01F ANDB |
| 0040 | EB00D0DB | :ORB= NOT AUR |
| 0041 | EB1F5EDB | :ORB= =0E0 ANDB |
| 0042 | EB001BDB | :ORB= ORA IORB |
| 0043 | E3BC5FCB | WATC:JMNR;WATC |
| 0044 | E7007FDF | :ORA= PROM INCA |
| 0045 | F3FD5FDB | INTE:ORC= SPA |
| 0046 | F300BFDB | :ORC= SP |
| 0047 | C30030DB | :RRR= NOT ALR |
| 0048 | 62001FDB | :ALR= ORA SETC |
| 0049 | F700905B | :ORA= ORC= ORC +CY |
| 004A | C300D0DB | :RRR= NOT AUR |
| 004B | E1005ADB | :AUR= ORB |
| 004C | F3FD5FDB | :ORC= SPA |
| 004D | C300105B | :SP= ORA +CY |
| 004E | E3F15FEB | :JUN ;FTCH |
| | | Bit test instruction |
| 004F | E3B05FCB | BTS :JMNR;BTS |
| 0050 | F3007FDF | :ORC= PROM INCA |
| 0051 | EB00BFDB | :ORB= RRR |
| 0052 | E3AD5FCB | WATA:JMNR;WATA |
| 0053 | AB007EDF | :ORB= PROM ANDB CLRC INCA |
| 0054 | E300465B | ZTC : =OFF+ORB LDCY |
| 0055 | E3435FEB | :JUN ;COUT |
| | | Move instructions |
| 0056 | E3A95FCB | MVR :JMNR;MVR |
| 0057 | F3007FDF | :ORC= PROM INCA |
| 0058 | C3001FDB | :RRR= ORA |
| 0059 | E3F15FEB | :JUN ;FTCH |
| | | Jump thru accumulator |
| 005A | AB0030DB | JPA :ORB= NOT ALR CLRC |
| 005B | E200A65B | :ALR= ACC +ORB LDCY |

-continued

| Address | Machine Code | Source Code |
|---|---|---|
| 005C | E700D0DB | :ORA= NOT AUR |
| 005D | E100105B | :AUR= ORA +CY |
| 005E | E3F15FEB | :JUN ;FTCH |

Jump on carry zero

| | | |
|---|---|---|
| 005F | B3FE5FDB | =005F:CLRC ORC=MCYA |
| 0060 | E33F5FEB | :JUN ;JCZ |

Output instructions

| | | |
|---|---|---|
| 0061 | EB0030DB | OUT :ORB= NOT ALR |
| 0062 | F3FF5FDB | :ORC= ACCA |
| 0063 | E2001FDB | :ALR= ORA |
| 0064 | E300BFDA | :IOWS ACC |
| 0065 | E2005ADB | :ALR= ORB |
| 0066 | E3F15FEB | :JUN ;FTCH |

Rotate left with count

| | | |
|---|---|---|
| 0067 | EBF85FDB | RLC :ORB= =007 |
| 0068 | E3975FCB | RLC1:JMNR;RCL1 |
| 0069 | E70071DF | :ORA= PROM NANB INCA |
| 006A | 63685FEB | :SETC JUN;RLC4 |

Increment register instructions

| | | |
|---|---|---|
| 006B | 6700BFDB | INC :ORA= RRR SETC |
| 006C | C300105B | :RRR= ORA +CY |
| 006D | E3F15FEB | :JUN ;FTCH |

Clear accumulator

| | | |
|---|---|---|
| 006E | C3005CDB | =006E:ACC= MCY= '00' |
| 006F | E3F15FEB | :JUN ;FTCH |

Jump table for one byte instructions

| | | |
|---|---|---|
| 0070 | F3FE5FDB | =0070:ORC=MCYA |
| 0071 | E3915FEB | :JUN ;006E |
| 0072 | E3635FEB | :JUN ;STC |
| 0073 | E32D5FEB | :JUN ;ROL |
| 0074 | E34D5FEB | :JUN ;BST |
| 0075 | E3265FEB | :JUN ;BCL |
| 0076 | E3D55FEB | :JUN ;JUX |
| 0077 | E3B05FEB | :JUN ;BTS |
| 0078 | E3715FEB | :JUN ;INA |
| 0079 | E3285FEB | :JUN ;DCA |
| 007A | E3745FEB | :JUN ;CMA |
| 007B | E33C5FEB | :JUN ;RFS |
| 007C | E3D95FEB | :JUN ;CMC |
| 007D | E3A55FEB | :JUN ;JPA |
| 007E | E3985FEB | :JUN ;RLC |
| 007F | E3E35FEB | =007F:JUN ;001C |
| 0080 | F3FF5FDB | =0080:0RC= ACCA |
| 0081 | E351566B | :JUN =OAE +ORB |

Store to memory

| | | |
|---|---|---|
| 0082 | EB00D0DB | STM :ORB= NOT AUR |
| 0083 | E70030DB | :ORA= NOT ALR |
| 0084 | 6200BFDB | :ALR= RRR SETC |
| 0085 | F300905B | :ORC= ORC +CY |
| 0086 | E100BFDB | :AUR= RRR |
| 0087 | F3FF5FDB | :ORC= ACCA |
| 0088 | E300BFD9 | :MEMW ACC |
| 0089 | E3765FCB | WAT9:JMNR;WAT9 |
| 008A | E3565FEB | :JUN ;REST |

Complement accumulator

| | | |
|---|---|---|
| 008B | E700B0DB | CMA :ORA=NOT ACC |
| 008C | C3001FDB | :ACC= ORA |
| 008D | E3F15FEB | :JUN ;FTCH |

Increment Accumulator

| | | |
|---|---|---|
| 008E | A7FE5FDB | INA :ORA= =001 CLRC |
| 008F | E3455FEB | :JUN ;ADD1 |
| 0090 | E36F5FCB | =0090:JMNR;0090 |
| 0091 | F3007FDF | :ORC= PROM INCA |
| 0092 | F300BFDB | :ORC= RRR |
| 0093 | 7700BFDB | :ORA= ORC= RRR SETC |
| 0094 | E3A3566B | :JUN =05C +ORB |

Rotate left with count

| | | |
|---|---|---|
| 0095 | EB00A35B | RLC3:ORB= ACC *2 LDCY |
| 0096 | CB00465B | :ORB= ACC= =OFF +ORB LDCY |
| 0097 | E700005B | RLC4:ORA= ORA +CY LDCY |
| 0098 | E36A4F9B | :LDCY JCZ ;RLC3 |
| 0099 | F3FE5FDB | :ORC= MCYA |
| 009A | C3FE5EDB | :MCY= =001 ANDB |
| 009B | E3F15FEB | :JUN ;FTCH |

Set carry

| | | |
|---|---|---|
| 009C | F3FE5FDB | STC :ORC= MCYA |
| 009D | C3FE5FDB | :MCY' =001 |
| 009E | E3F15FEB | :JUN ;FTCH |

Jump on accumulator not zero

| | | |
|---|---|---|
| 009F | B3FF5FDB | =009F:ORC= ACCA CLRC |
| 00A0 | E3E25FEB | :JUN ;JCN |

Load memory instruction

| | | |
|---|---|---|
| 00A1 | EB00D0DB | LDM :ORB= NOT AUR |
| 00A2 | E70030DB | :ORA= NOT ALR |
| 00A3 | 6200BFDB | :ALR= RRR SETC |
| 00A4 | F300905B | :ORC= ORC +CY |
| 00A5 | E100BFDB | :AUR= RRR |
| 00A6 | F3FF5FDB | :ORC= ACCA |
| 00A7 | E3585FCB | WAT8:JMNR;WAT8 |
| 00A8 | C3007FDB | :ACC= PROM |
| 00A9 | E1005ADB | REST:AUR= ORB |

-continued

| Address | Machine Code | Source Code | |
|---|---|---|---|
| 00AA | E2001FDB | :ALR= ORA | |
| 00AB | E3F15FEB | :JUN ;FTCH | |
| | | Input instructions | |
| 00AC | E70030DB | IN :ORA= NOT ALR | |
| 00AD | E2009FDB | :ALR= ORC | |
| 00AE | F3FF5FDB | :ORC= ACCA | |
| 00AF | C300F0DB | :ACC= NOT IDB | |
| 00B0 | E2001FDB | :ALR= ORA | |
| 00B1 | E3F15FEB | :JUN ;FTCH | |
| | | Bit set instruction | |
| 00B2 | E34D5FCB | BST :JMNR;BST | |
| 00B3 | F3007FDF | :ORC= PROM INCA | |
| 00B4 | EB00BFDB | :ORB= RRR | |
| 00B5 | E34A5FCB | WAT4:JMNR;WAT4 | |
| 00B6 | C3007BDF | :RRR= PROM IORB INCA | |
| 00B7 | E3F15FEB | :JUN ;FTCH | |
| | | Subtract entry | |
| 00B8 | E70010DB | SUB :ORA= NOT ORA | |
| | | Add entry | |
| 00B9 | F3FF5FDB | ADD :ORC=ACCA | |
| | | Entry from INA, DCA, ROL | |
| 00BA | EB00BFDB | ADD1:ORB= ACC | |
| 00BB | C300065B | RENT:ACC= ORA +ORB LDCY | |
| | | Carry out routine | |
| 00BC | F3FE5FDB | COUT:ORC= MCYA | |
| 00BD | C3FF505B | :MCY= =000 +CY | |
| 00BE | E3F15FEB | :JUN ;FTCH | |
| | | Jump on accumulator zero | |
| 00BF | B3FF5FDB | =00BF:CLRC ORC= ACCA | |
| 00C0 | E300AF5B | JCZ :RRR −1+C LDCY | |
| 00C1 | E3E05F9B | :JCZ ;001F | |
| 00C2 | E3F15FEF | INCO:INCA JUN ;FTCH | |
| | | Return from subroutine instruction | |
| 00C3 | B3FD5FDB | RFS :ORC= SPA CLRC | |
| 00C4 | F300BF5B | :ORC= SP −1+C | |
| 00C5 | E100BFDB | :AUR= RRR | |
| 00C6 | F7009F5B | :ORA= ORC= ORC −1+C | |
| 00C7 | E200BFDB | :ALR= RRR | |
| 00C8 | F3FD5FDB | :ORC= SPA | |
| 00C9 | C3001FDB | :SP= ORA | |
| 00CA | E3F15FEB | :JUN ;FTCH | |
| | | Compare instructions | |
| 00CB | F3FF5FDB | COM :ORC= ACCA | |
| 00CC | AB00BFDB | :ORB= ACC CLRC | |
| 00CD | AB0019DB | :ORB= ORA XORB CLRC | |
| 00CE | E3AB5FEB | :JUN ;ZTC | |
| | | Decrement register instructions | |
| 00CF | A700BFDB | DEC :ORA= RRR CLRC | |
| 00D0 | C3001F5B | :RRR= ORA −1+C | |
| 00D1 | E3F15FEB | :JUN ;FTCH | |
| | | Rotate left | |
| 00D2 | B3FE5FDB | ROL :ORC= MCYA CLRC | |
| 00D3 | E300AF5B | :MCY −1+C LDCY | |
| 00D4 | F3FF5FDB | :ORC= ACCA | |
| 00D5 | EF00BFDB | :ORB= ORA= ACC | |
| 00D6 | E3445FEB | :JUN ;RENT | |
| | | Decrement accumulator | |
| 00D7 | A7005FDB | DCA :ORA= =0FF CLRC | |
| 00D8 | E3455FEB | :JUN ;ADD1 | |
| | | Bit clear instruction | |
| 00D9 | E3265FCB | BCL :JMNR;BCL | |
| 00DA | F3007FDF | :ORC= PROM INCA | |
| 00DB | EB00BFDB | :ORB= RRR | |
| 00DC | E3235FCB | WAT5:JMNR;WAT5 | |
| 00DD | C3007EDF | :RRR= PROM ANDB INCA | |
| 00DE | E3F15FEB | :JUN ;FTCH | |
| 00DF | E36F5EEB | =00DF:JUN =090 ANDB | |
| | | E Group instructions | |
| 00E0 | E31F5FCB | =00E0:JMNR;00E0 | |
| 00E1 | F3007FDF | :ORC= PROM INCA | |
| 00E2 | 7700BFDB | :ORA= ORC= RRR SETC | |
| 00E3 | E3B3566B | :JUN =04C +ORB | |
| | | Exclusive or instructions | |
| 00E4 | F3FF5FDB | XOR :ORC= ACCA | |
| 00E5 | EB00BFDB | :ORB= ACC | |
| 00E6 | C30019DB | :ACC= ORA XORB | |
| 00E7 | E3F15FEB | :JUN ;FTCH | |
| | | Inclusive or instructions | |
| 00E8 | F3FF5FDB | OR :ORC= ACCA | |
| 00E9 | EB00BFDB | :ORB= ACC | |
| 00EA | C3001BDB | :ACC= ORA IORB | |
| 00EB | E3F15FEB | :JUN ;FTCH | |
| | | And instructions | |
| 00EC | F3FF5FDB | AND :ORC= ACCA | |
| 00ED | EB00BFDB | :ORB= ACC | |
| 00EE | C3001EDB | :ACC= ORA ANDB | |
| 00EF | E3F15FEB | :JUN ;FTCH | |
| | | F Group instructions | |
| 00F0 | E30F5FCB | =00F0:JMNR;00F0 | |
| 00F1 | 77007FDF | :ORA= ORC= PROM INCA SETC | |
| 00F2 | E3C3566B | :JUN =03C +ORB | |

-continued

| Address | Machine Code | Source Code |
|---------|--------------|-------------|
|         |              | Decrement and jump instruction |
| 00F3    | E700BF5B     | DJX :ORA= RRR −1+C |
| 00F4    | C3000FDB     | :RRR= ORA LDCY |
| 00F5    | E33D5F9B     | :JCZ ;INCO |
| 00F6    | E3095FCB     | WAT7:JMNR;WAT7 |
| 00F7    | E300635B     | :PROM *2 LDCY |
| 00F8    | E700505B     | :ORA= =OFF +CY |
| 00F9    | 6B0030DB     | :ORB= NOT ALR SETC |
| 00FA    | E200665B     | :ALR= PROM +ORB LDCY |
| 00FB    | EB001FDB     | :ORB= ORA |
| 00FC    | E700D0DB     | :ORA= NOT AUR |
| 00FD    | E100195B     | :AUR= ORA −ORB |
| 00FE    | E3F15FEB     | :JUN ;FTCH |
|         |              | EX and FX instructions run thru here |
| 00FF    | E30F5EEB     | =00FF:JUN =OFO ANDB |

Macro Instruction Set

The foregoing micro control program operates with the following macro instructions. A macro instruction set of 68 commands can be supported, including full arithmetic and logic capabilities, conditional jump instructions, a flexible subroutine facility, and special bit manipulation instructions. All of the arithmetic and logical instructions and many of the other instructions can be used with either immediate, register, or indirect operands.

Arithmetic and Logical Instructions

There are 18 arithmetic and logical instructions. In each of these instructions, a two-byte format is used. The first byte contains an operation code. The second byte contains data or a data address:

Add data (Op Code: 11110001). The data in the second byte of the instruction is added to the accumulator. If there is a carry out, the carry is set, otherwise it is cleared.

Add register (Op Code: 11100001). The contents of the register selected by the second byte of the instruction are added to the accumulator. If there is a carry out, the carry is set, otherwise the carry is cleared.

Add indirect (Op code: 11010001). The second byte of the instruction selects a register which addresses a register whose contents are added to the accumulator. If there is a carry out, the carry is set, otherwise it is cleared.

Subtract data (Op code: 11110000). The data in the second byte of the instruction is subtracted from the accumulator. If there is a borrow out, the carry is cleared, otherwise it is set.

Subtract register (Op code: 11100000). The contents of the register selected by the second byte of the instruction are subtracted from the accumulator. If there is a borrow out, the carry is cleared, otherwise it is set.

Subtract indirect (Op code: 11010000). The second byte of the instruction selects a register which addresses a register whose contents are subtracted from the accumulator. If there is a borrow out, the carry is cleared, otherwise it is set.

And data (Op code: 11110010). The data in the second byte of the instruction is logically and'd with the accumulator. The carry is unaffected.

And register (Op code: 11100010). The contents of the register selected by the second byte of the instruction are logically and'd with the accumulator. The carry is unaffected.

And indirect (Op code: 11010010). The second byte of the instruction selects a register which addresses a register whose contents are logically and'd with the accumulator. The carry is unaffected.

Inclusive or data (Op code: 11100011). The data in the second byte of the instruction is logically or'd with the accumulator. The carry is unaffected.

Inclusive or register (Op code: 11100011). The contents of the register selected by the second byte of the instruction are logically or'd with the accumulator. The carry is unaffected.

Inclusive or indirect (Op code: 11010011). The second byte of the instruction selects a register which addresses a register whose contents are logically or'ed with the accumulator. The carry is unaffected.

Exclusive or data (Op code: 11110100). The data in the second byte of the instruction is exclusive-or'd with the accumulator, that is, each result bit is a '1' if and only if the two corresponding operand bits differ. The carry is unaffected.

Exclusive or register (Op code: 11100100). The contents of the register selected by the second byte of the instruction are exclusive −or'd with the accumulator, that is, each bit is a '1' if and only if the two corresponding operand bits differ. The carry is unaffected.

Exclusive or indirect (Op code: 11010100). The second byte of the instruction selects a register which addresses a register whose contents are exclusive − or'd with the accumulator, that is, each result bit is a '1' if and only if the two corresponding operand bits differ. The carry is unaffected.

Compare data (Op code: 11110101). The data in the second byte of the instruction is compared to the accumulator. If it matches, the carry is cleared, otherwise it is set. The accumulator is not affected.

Compare register (Op code: 11100101). The contents of the register selected by the second byte of the instruction are compared to the accumulator. If they match, the carry is cleared, otherwise it is set. The accumulator is not affected.

Compare indirect (Op code: 11010101). The second byte of the instruction selects a register which addresses a register whose contents are compared to the accumulator. If they match, the carry is cleared, otherwise it is set. The accumulator is not affected.

Accumulator and Carry Instructions

There are nine instructions for affecting the accumulator and the carry. In the following eight instructions, the one-byte format is used consisting solely of the operation code:

Increment accumulator (Op code: 11001001). The accumulator is incremented by 1. If there is a carry out the carry is set, otherwise it is cleared.

Decrement accumulator (Op code: 11001010). The accumulator is decremented by 1. If there is a borrow-out the carry is cleared, otherwise it is set.

Complement accumulator (Op code: 11001011). The accumulator is logically complemented. The carry is not affected.

Clear accumulator (Op code: 11000010). The accumulator is set to zero. The carry is unaffected.

Rotate left (Op code: 11000100). The accumulator and carry are rotated left one bit. The carry receives the old high-order bit of the accumulator. The low-order bit of the accumulator receives the old value of the carry.

Clear carry (Op code: 11000001). The carry is cleared.

Set carry (Op code: 11000011). The carry is set.

Complement carry (Op code: 11001101). The carry is complemented.

In the following instruction, a two-byte format is used. The first byte contains the operation code. The second byte contains the count:

Rotate left with count (Op code: 11001111). The accumulator is rotated left by the number of bits indicated in the count. The low order bit of the result is placed in the carry.

Load and Store Instructions

The following six load and store instructions use a two-byte format. The first byte contains an operation code. The second byte contains data or a data address:

Load data (Op code: 11111111). The data in the second byte of the instruction is loaded into the accumulator.

Load register (Op code: 11101111). The contents of the register selected by the second byte of the instruction are loaded into the accumulator.

Load indirect (Op code: 11011111). The second byte of the instruction selects a register which addresses a register whose contents are loaded into the accumulator.

Store register (Op code: 11111001). The accumulator is stored into the register selected by the second byte of the instruction.

Store indirect (Op code: 11101001). The accumulator is stored into the register addressed by the register selected by the second byte of the instruction.

Store doubly indirect (Op code: 11011001). The accumulator is stored into the register addressed by the register addressed by the register selected by the second byte of the instruction.

Register Instructions.

There are nine register intructions. The following six instructions use a two-byte format. The first byte contains an operation code. The second byte contains a register address:

Decrement register (Op code: 11110111). The register selected by the second byte of the instruction is decremented by 1. The carry is not affected.

Decrement indirect (Op code: 11100111). The register addressed by the register selected by the second byte of the instruction is decremented by 1. The carry is unaffected.

Decrement doubly indirect (Op code: 11010111). The register addressed by the register addressed by the register selected by the second byte of the instruction is decremented by 1. The carry is unaffected.

Increment register (Op code: 11110110). The register selected by the second byte of the instruction is incremented by 1. The carry is unaffected.

Increment indirect (Op code: 11100110). The register addressed by the register selected by the second byte of the instruction is incremented by one. The carry is unaffected.

Increment doubly indirect (Op code: 11010110). The register addressed by the register addressed by the register selected by the second byte of the instruction is incremented by 1. The carry is unaffected.

The following three register instructions use a three-byte format. The first byte contains an operation code. The second byte contains a register address. The third byte contains a mask:

Bit set (Op code: 11000101). The mask is logically or'd with the register addressed by the second byte of the instruction. The result is placed in the register.

Bit clear (Op code: 11000110). The mask is logically and'd with the register addressed by the second byte of the instruction. The result is placed in the register.

Bit test (Op code: 11001000). The mask is logically and'd with the register addressed by the second byte of the instruction. If the result is 0, the carry is cleared, otherwise it is set.

Loop Instructions

There are three loop instructions. Each of these instructions uses a three-byte format. The first byte contains an operation code. The second byte contains a register address. The third byte contains an offset which must be greater than or equal to −128 and less than or equal to +127.

Decrement and jump register (Op code: 11111000). The register selected by the second byte of the instruction is decremented by one. If the result is not zero, the offset in the third byte of the instruction is added to the program counter, i.e. control jumps backwards or forwards by the number of bytes specified in the offset. Negative offsets are represented in 2's complement form. An offset of zero is equivalent to no jump being taken. The carry is not affected.

Decrement and jump indirect (Op code: 11101000). The register addressed by the register selected by the second byte of the instruction is decremented by one. If the result is not zero, the offset is added to the program counter as in the decrement-and-jump-register instruction. The carry is not affected.

Decrement and jump doubly indirect (Op code: 11011000). The register addressed by the register addressed by the register selected by the second byte of the instruction is decremented by one. If the result is not zero, the offset is added to he program counter as in the decrement-and-jump-register instruction. The carry is not affected.

Move Instructions

There are three move instructions, each of which use a three-byte format. The first byte contains an operation code. The second byte contains a source address or data. The third byte contains a destination address:

Move data (Op code: 11111110). The data in the second byte of the instruction is stored into the register selected by the third byte of the instruction. The accumulator is unaffected.

Move register (Op code: 11101110). The contents of the register selected by the second byte of the instruction are stored into the register selected by the third byte of the instruction. The accumulator is unaffected.

Move indirect (Op code: 11011110). The contents of the register addressed by the register selected by the second byte of the instruction are stored into the register selected by the third byte of the instruction. The accumulator is unaffected.

Memory Reference Instructions

There are six memory reference instructions. Each instruction uses a two-byte format. The first byte contains an operation code. The second byte contains a register address:

Load memory register (Op code: 11111100). The memory location addressed by R and R+1 is loaded into the accumulator, where R is the register selected by the second byte of instruction, and R+1 is the following register. R contains the low-order half of the memory address, R+1 contains the high-order half.

Load memory indirect (Op code: 11101100). Same operation as load-memory-register, except that R is the register addressed by the register selected by the second byte of the instruction.

Load memory doubly indirect (Op code: 11011100). Same operation as load-memory-register, except that R is the register addressed by the register addressed by the register selected by the second byte of the instruction.

Store memory register (Op code: 11111101). The accumulator is stored in the memory location addressed by R and R+1, where R is the register selected by the second byte of the instruction and R+1 is the following register. R contains the low-order half of the memory address, and R+1 contains the high-order half.

Store memory indirect (Op code: 11101101). Same operation as store-memory-register except that R is the register addressed by the register selected by the second byte of the instruction.

Store memory doubly indirect (Op code: 11011101). Same operation as store-memory-register except that R is the register addressed by the register addressed by the register selected by the second byte of the instructions.

Jump Instructions

These are seven jump instructions. The following six instructions use a two-byte format. In the first byte, the upper three bits contain an operation code, and the lower five bits contain the upper five bits of a 13-bit address. The second byte contains the lower 8 bits of the address:

Jump unconditional (Op code: 000). The lower 13 bits of the program counter are loaded with the 13-bit address contained in the instruction, i.e. the next instruction will be fetched from the given address within the current 8K page.

Jump if accumulator zero (Op code: 101). If the accumulator is zero, a jump is taken as in the jump-unconditional instruction, otherwise no action is taken.

Jump if accumulator not zero (Op code: 100). If the accumulator is not zero, a jump is taken as in the jump-unconditional instruction, otherwise no action is taken.

Jump if carry zero (Op code: 010). If the carry is zero, a jump is taken as in the jump-unconditional instruction, otherwise no action is taken.

Jump if carry not zero (Op code: 011). If the carry is not zero, a jump is taken as in the jump-unconditional instruction, otherwise no action is taken.

Jump to subroutine (Op code: 001). The low-order half of the old program counter is stored in the register addressed by the stack pointer. The high-order five bits are stored in the following register. The stack pointer is incremented by two. The program counter is loaded with the 13 bit address in the instruction.

The following jump instruction uses a three-byte format. The first byte contains the operation code. The second and third bytes contain a 16-bit address:

Jump unconditional extended (Op Code: 11000111). The program counter is loaded with the 16-bit address contained in the instructions, i.e., the next instruction will be fetched from the given address. This instruction is used to transfer control between different 8K pages of memory.

Input/Output Instructions

In the following six I/O instructions, a two-byte format is used. The first byte contains an operation code. The second byte contains an address:

Input direct (Op code: 11111010). The data at the input port selected by the second byte of the instruction is read to the accumulator.

Input register (Op code: 11101010). The data at the input port addressed by the register selected by the second byte of the instruction is read into the accumulator.

Input indirect (Op code: 11011010). The data at the input port addressed by the register addressed by the register selected by the second byte of the instruction is read into the accumulator.

Output direct (Op code: 11111011). The accumulator is written to the output port selected by the second byte of the instruction.

Output register (Op code: 11101011). The accumulator is written to the output port addressed by the register selected by the second byte of the instruction.

Output indirect (Op code: 11011011). The accumulator is written to the output port addressed by the register addressed by the register selected by the second byte of the instruction.

Other Instructions

Finally, there are three other instructions. Each of these instructions uses a one-byte format containing solely the operation code:

Return from subroutine (Op code: 11001100). The stack pointer is decremented by two. The low-order half of the program counter is loaded from the register addressed by the stack pointer. The high-order half of the program counter is loaded from the following register.

Jump through accumulator (Op code: 11001110). The accumulator is added to the program counter. The accumulator and carry are not affected.

No operation (Op code: 11000000).

CONCLUSION

It can be seen from the foregoing that the relative simplicity of the architecture of the present invention permits very fast processing times. Another advantage of the invention is its low cost. The entire CPU including the control unit can be constructed from the 48 off-the-shelf integrated circuit packages. The CPU is also compact. The units can be arranged to fit on a single printed circuit board measuring no more than eight inches square.

The microprocessor described herein is designed to operate with 8-bit binary data words. This has been found to be the preferred word length for applications requiring fast combined arithmetic and logical capabilities such as traffic monitoring and signal control. However, in a more sophisticated arithmetic applications such as machine tool control, a longer data word such as 16 bits or 32 bits may be desired. It is understood that one skilled in the computer design art could build a 16-bit or 32-bit microprocessor using the architecture of the present invention based upon the disclosure given herein.

Other modifications and variations in the specific apparatus herein shown and described will be apparent to those skilled in the art all within the intended scope and spirit of the invention. While the invention has been shown and described with respect to a specific embodiment thereof, this is intended for the purpose of illustration rather than limitation. Accordingly, the invention is not to be limited to the specific embodiment herein shown and described nor in any other way that is inconsistent with the extent to which the progress in the art has been advanced by the invention.

We claim:

1. In a microprocessor having a central processing unit, memories external to the central processing unit and operatively connected thereto, and input/output devices operatively connected to the central processing unit, said microprocessor operating in response to input macro instructions stored in one of the external memories, said central processing unit comprising:
   a. a first data bus to carry data through the central processing unit and to cary data to the external memories and input/output devices;
   b. an arithmetic logic unit which performs operations on the data, said unit having two inputs for receiving operand data, and said unit supplying resulting data to the first data bus;
   c. a carry register associated with the arithmetic logic unit;
   d. a multiplexor having a plurality of inputs and having an output connected to one of the inputs of the arithmetic logic unit, said multiplexor passing selected data from the plurality of inputs to the output;
   e. two operand registers connected to receive input data from the first data bus and each having an output connected to one of the inputs of the multiplexor;
   f. a scratchpad register connected to receive input data from the first data bus and connected to receive an address from the output of one of the two operand registers, and having an output connected to one of the inputs of the multiplexor;
   g. an address counter connected to receive input address data from the first data bus and having an output connected to at least one of the inputs of the multiplexor, and to the external memories and input/output devices;
   h. a second data bussing means for carrying data from the external memories and input/output devices to one of the inputs of the multiplexor;
   i. a third operand register connected to receive input data from the first data bus and having an output connected to the other input of the arithmetic logic unit; and
   j. a control unit including:
      1. a read only memory having a plurality of addressable word locations each storing an instruction of a present micro control program, and having a plurality of outputs for supplying data to one of the inputs of the multiplexor and for supplying control signals in dependence upon the micro instruction to each counter, register and unit in the central processing unit over a plurality of control lines;
      2. a source of clock pulses;
      3. means for addressing one of the word locations so as to output control signals therefrom,
         said addressing means having a first operating mode for incrementally addressing the word locations in a predetermined sequence and a second actuatable operating mode for addressing a specific one of the word locations,
         said addressing means including means for incrementing a multiple-bit binary address stored in the addressing means in response to each clock pulse while the addressing means is in the first mode, and
         said addressing means including means for loading the specific address outputted from the arithmetic logic unit in response to each clock pulse while the addressing means is in the second mode,
         whereby one instruction of the micro control program is executed for each clock pulse; and
      4. mode control means for actuating the addressing means from the first mode to the second mode in dependence upon the micro instruction represented by certain control signals supplied from the memory outputs, said mode control means including means for receiving a plurality of input status signals from the external memories and other units external to the central processing unit and from the carry register, each status signal having a first or second signal level and passing a selected one of the status signals in dependence upon the certain control signals, and means responsive to the selected status signals actuating the addressing means to its second mode when the selected status signal exhibits the second signal level.

2. A central processing unit as defined in claim 1, wherein the control unit includes:
   1. means for inputting a macro instruction in accordance with the address data stored in the address counter;
   2. means for decoding the macro instruction to ascertain the desired operations;
   3. means for executing the input macro instruction, including those macro instructions employing indirect addressing, to perform arithmetic and logic operations and bit manipulations on data and to adjust the address counter in preparation for jump instructions and subroutines;
   4. means for monitoring each of the plurality of status signals during the execution of each macro instruction; and
   5. means for controlling the inputs of data from, and the output of data to, the external memories and input/output devices.

3. A central processing unit as defined in claim 1 wherein each of the elements operates with 8-bit data words and the address counter maintains a two-word address.

4. A central processing unit as defined in claim 3 wherein the scratchpad register has at least 256 words of storage.

* * * * *